United States Patent [19]
Gillner et al.

[11] Patent Number: 5,324,373
[45] Date of Patent: Jun. 28, 1994

[54] METHOD OF MAKING A CURVED GLASS PANE OF LAMINATED GLASS

[75] Inventors: Manfred Gillner, Aachen; Hubert Havenith, Würselen; Luc Vanaschen, Eupen, Fed. Rep. of Germany

[73] Assignee: Saint-Gobain Vitrage International, Courbevoie, France

[21] Appl. No.: 5,285

[22] Filed: Jan. 19, 1993

[30] Foreign Application Priority Data

Jan. 18, 1992 [DE] Fed. Rep. of Germany ....... 4201275

[51] Int. Cl.$^5$ .................... B32B 17/00; C03B 23/025
[52] U.S. Cl. ..................... 156/99; 156/196; 156/277; 156/289; 219/203; 65/55; 65/60.1
[58] Field of Search .............. 156/99, 100, 102, 212, 156/214, 221, 277, 196, 289; 219/203, 522, 543; 52/171 W; 296/84.1; 65/55, 102, 107, 60.1

[56] References Cited

U.S. PATENT DOCUMENTS

| | | | |
|---|---|---|---|
| 2,944,926 | 7/1960 | Gaiser | 156/102 |
| 3,001,901 | 9/1961 | Barkley | 156/102 |
| 4,263,350 | 4/1981 | Valimont | 156/289 |
| 4,277,299 | 7/1981 | Cherenko et al. | 156/289 |
| 4,644,139 | 2/1987 | Harrison et al. | 52/171 W |
| 4,668,270 | 5/1987 | Ramus | 219/203 |
| 4,718,932 | 1/1988 | Pharms | 65/55 |
| 4,744,844 | 5/1988 | Hurst | 219/203 |
| 4,786,784 | 11/1988 | Nikodem et al. | 219/203 |
| 5,011,745 | 4/1991 | Dietrich et al. | 219/522 |

OTHER PUBLICATIONS

Docket No. 1247-465-0V*, Ser. No. 08/005,285, Filing or Issue Date: Jan. 19, 1993, Status or Patentee: Pending.

Docket No. 1247-486-3V, Ser. No. 08/059,137, Filing or Issue Date: May 10, 1993, Status or Patentee: Pending.

*Primary Examiner*—Jeff H. Aftergut
*Assistant Examiner*—R. Robey
*Attorney, Agent, or Firm*—Oblon, Spivak, McClelland, Maier & Neustadt

[57] ABSTRACT

The subject of this invention is a method of making a curved glass pane of laminated glass, such as an automobile windshield, in which one of the two single glass sheets is provided, on the surface bearing against an intermediate layer, with a film of a baking finish. The baking finish is applied onto the inner face of the single glass sheet intended for the outside. The glass sheet, provided with the dried baking finish (i.e., a colored film), is laid, with the film upwards, onto the single glass sheet intended for the inside. The pair of glass sheets, in this arrangement, is prebent on a bending frame with simultaneous baking-in of the colored film. Subsequently, the two glass sheets are transposed and, in this transposed arrangement with the colored film on the inside, are finally bent in a second bending operation on a bending frame corresponding to the final shape of the outer sheet.

20 Claims, No Drawings

METHOD OF MAKING A CURVED GLASS PANE OF LAMINATED GLASS

BACKGROUND OF THE INVENTION

1. Field of the Invention

This invention relates to the manufacture of curved glass panes of laminated glass. The panes contain two glass sheets and an inner, intermediate layer, typically a thermoplastic film. At least one of the two glass sheets is provided with a printed surface which is to be baked-in prior to the bending of the two glass sheets, as a pair, into the final shape.

2. Discussion of the Background

Laminated glass window panes, particularly for automobile windshields or rear windows, often have printed surfaces. The printed surfaces may be, for instance, colored films, decorative frames, and heating resistors. When the printed material is to be baked-in (i.e., when using a printing ink, or an enamel or enamel-like substance), the printed material is referred to as a "baking finish". It is desirable to place such a baking finish on an internal surface of the glass pane, that is, on a surface bearing against the thermoplastic film.

However, the application of a baking finish and the subsequent baking-in process presents problems when a curved glass laminated pane is manufactured. It has previously not been possible to carry out the baking-in process during the course of the bending operation. This is because baking finishes contain organic constituents which form gaseous reaction products at the baking temperature. The gases cannot escape from the space between the two glass sheets. Furthermore, there is an increased risk that in the melting of the baking finish the two glass sheets will stick together.

The bending of glass sheets in pairs with simultaneous baking-in of an enamel film is described in EP 0 013 970 B1. This method is only for the case in which the baking finish is applied in a central partial region of the glass pane. During the baking and bending of a pair of glass sheets, each sheet opens out somewhat because of the higher temperature of the outer surface compared with the temperature of the inner surface. This allows the reaction gases to escape and prevents the two glass sheets from sticking together. If, in contrast, the baking finish extends over fairly large regions, this method can no longer be used.

In the case of fairly large printed areas on one of the inner faces of a laminated glass pane, the normal procedure is as follows. A single glass sheet is provided with a printed baking finish. This sheet is then subjected, alone and in the plane state with the printed surface upwards, to a heat treatment process. The baking finish, for instance, an enamel film, is melted and baked in. After cooling, this glass sheet with the baked-in enamel film is brought together with the second glass sheet and the pair of glass sheets are together bent into their final shape. In this joint bending process, reaction products from the baking finish are not given off. Sticking together of the sheets is avoided by powdered parting agents applied to the internal surfaces. These parting agents are washed off after the bending and before further processing to form the laminated pane. This method is known, for example, from DE 39 20 573 A1, which describes baking-in an enamel film on a flat glass sheet in a preliminary process step.

However, such a process makes heavy demands upon baking furnaces suitable for this purpose, because the glass sheet with the printed surface not only must remain absolutely flat and without deformations, but also must not possess any internal stresses. Any deformation or internal stress in the baking process will lead to perturbing deformations in the later bending process. It has, for example, been found that even the transporting of the hot glass sheets on conveying rollers can lead to slight deformations with the result that, for example, windscreens produced by this technique cannot satisfy strict criteria with regard to their optical quality.

SUMMARY OF THE INVENTION

Accordingly, one object of the present invention is to create a method for the production of curved glass panes with internal printed surfaces, particularly an automobile windshield or rear window, that will be simple to carry out. Despite its simplicity, the process allows the manufacture of optically correct laminated glass panes without perturbing deformations.

A further object of the invention is to exploit the usual gravity bending in the production of curved glass while carrying out the baking-in of a baking finish in a more efficient manner.

Still another object is to provide a bending operation for a printed window pane which allows a more gentle, final step, so that lower temperatures and/or shorter times are used, and so that the problem of sticking of the two glass sheets is reduced.

The method according to this invention consists in the following steps. A baking finish (such as a colored film) is coated onto at least a portion of the inner face of the single glass sheet intended for the outer side of the pane (e.g., the outside of a windshield), and dried. This single glass sheet is laid, with the coated face upwards, on the single glass sheet intended for the inner side of the pane (e.g., the passenger side of a windshield). The pair of sheets is prebent, that is, bent into a shape not intended to be the final shape. Such a "prebending" step may occur on a frame-shaped bending mold. This prebending occurs with simultaneous melting and baking-in of the baking finish. After the cooling of the prebent glass sheets, the Single glass sheet having the baked-in colored film is provided with a heat-resistant parting agent and the two single glass sheets are transposed. The prebent pair of sheets, now with the baked-in colored film on the inside, are then jointly bent to the final shape. Preferably, this final shaping step occurs on a frame-shaped bending mold corresponding to the final shape of the outer glass sheet.

The method according to this invention therefore makes use of the method of bending usual for the production of curved laminated glass panes by gravity bending of the pair of glass sheets on an open or frame-shaped bending mold, while also carrying out the baking-in process. As a consequence, not only is the printed single glass sheet uniformly supported in an ideal manner during the baking-in operation, but during the baking-in of the colored film a considerable prebending of the coated glass sheet takes place. Thus the subsequent, final bending operation can be carried out more gently, that is, a somewhat lower temperature and/or with shorter bending times. In this way the risk of the two glass sheets becoming stuck together by the melting baking finish is further reduced.

In an advantageous further embodiment of the invention, an open or frame-shaped bending mold is used wherein the bending surface which comes into contact with the glass sheet corresponds to the final shape of the inner sheet of the laminated glass pane. A further advantageous embodiment uses, for the second bending step, an open or frame-shaped bending mold having a bending surface which corresponds to the final shape of the outer glass sheet. In this way a bent pair of glass sheets is obtained wherein, in spite of the preceding baking operation, the two single glass sheets are in optimum conformity on their inner faces bearing against each other or an intermediate layer. In this manner, deformations of the glass sheets which can lead to optical diffraction defects or to refraction defects, are reliably avoided.

The method according to this invention can be applied successfully for an extremely wide variety of purposes. For example, it may find an application in the production of laminated glass panes in which one of the two single glass sheets is provided, on the face bearing against the thermoplastic intermediate film, with a decorative frame of a baking finish. Glass panes having an opaque decorative frame are always required when the glass panes are attached to the window frame of the vehicle bodywork by gluing. In various cases it may be advantageous to arrange this decorative frame, not in the usual way on the outer surface of the inwardly facing laminated glass pane, but instead in the interior of the laminated glass pane. The method has proved particularly advantageous for the production of electrically heatable laminated glass panes, in which the heating resistor consists of a printed-on and baked-in conducting metal film. In such heatable laminated glass panes, in addition to the baked-in conducting films, frame-shaped or areal decorative coatings, also added as a baking finish, may be provided. For the production of such heating panes, therefore, a plurality of printing operations, each having a subsequent drying operation, are frequently necessary. It has been found that the method according to this invention is itself eminently suitable for complex laminated glass panes of this class.

DESCRIPTION OF THE PREFERRED EMBODIMENTS

Two examples of specific embodiments are now described, in which the method according to this invention is applied. Numerous modifications and variations of the present invention are possible in light of the above teachings. It is therefore to be understood that within the scope of the appended claims, the invention may be practiced otherwise than as specifically described herein. In other words, the process applies to any manufacturing process wherein glass is shaped. Furthermore, the intermediate layer could be any layer, such as a layer of air or a vacuum.

EXAMPLE 1

A heatable automobile windshield is to be made of laminated glass, in which one of the two single glass sheets is provided, on the face bearing against a thermoplastic film, with a transparent heating layer having a multilayered construction.

To characterize the different surfaces of the two single glass sheets which will be processed to the laminated glass pane, we hereinafter consistently designate, considering the laminated glass pane in its installed condition, the outwardly facing surface of the outer (or first) single glass sheet as side I. The surface of this outer single glass sheet bearing against the thermoplastic intermediate film is designated side II. Continuing this numbering, side III is that surface of the single glass sheet nearest the passenger space which bears against the thermoplastic intermediate film. The surface of this inner (or second) glass sheet towards the passenger space is designated side IV.

After the two glass sheets have been cut to the desired shape, the plane single glass sheet intended as the outer sheet in the finished laminated glass pane is first provided on side II, by the silk screen printing process, with a peripheral, frame-shaped decorative print of a baking finish, in this case a colored film. In a drying operation, the printed-on color film is dried. After drying, in a second screen printing operation, two strip-shaped electrodes of a baking finish containing metallic silver are printed along two mutually opposite edges, in order to form, in a later step, the supply electrodes for the heating film. This printed-on conducting silver coating also is first subjected to a drying operation.

The thus prepared, outer single glass sheet is now placed, with the printed side II upwards, on side IV of the inner single glass sheet. The pair of glass sheets is now placed upon a frame-shaped bending mold, the bending surface of which corresponds to the final shape of side III of the future inner glass sheet. The pair of glass sheets, in this arrangement, are now traversed with the frame-shaped bending mold mounted on a travelling trolley, through a conventional bending furnace. The glass sheets, under the action of their own weight, hug the shape of the bending mold when they reach bending temperature. During this bending operation, the decorative film and the electrically conducting films are fused and baked into the glass surface.

After the glass sheets leave the bending furnace, they are allowed to cool. The upper glass sheet provided with the baked-in film, is now provided with a pulverulent parting agent, for example talc.

The two sheets are now transposed. The upper glass sheet is lifted off and in this position, that is to say with side I downwards, is laid on another frame-shaped bending mold. The bending surface of this second mold is slightly different from the bending surface of the bending mold first used, and corresponds exactly to the final shape of side I of the future outer sheet. Onto this glass sheet the other glass sheet, which during the baking operation rested directly on the bending mold, is now placed so that side III rests upon side II. In this arrangement, the pair of glass sheets are once again traversed with the frame-shaped mold through the bending furnace. The pair of glass sheets now receives its final shape.

After the glass sheets have been bent in this manner, they are separated from each other and washed. By the use of a suitable coating process, notably by the method of magnetic field-assisted cathodic sputtering, an electrically conducting multilayer system is now applied onto side II over the baked-in films. Further or additional processing takes place in the known way (e.g., application of the intermediate thermoplastic film).

It is to be understood that the designations of "inner" and "outer" above apply to an automobile windshield, but are arbitrary for a generic pane of glass sheets and can be interchanged in the above description, depending on the use to which the pane is put.

EXAMPLE 2

An electrically heatable rear window pane is to be made of laminated glass, in which the heating resistor is disposed inside the laminated glass pane and consists of printed-on and baked-in conductor strips of a baking paste.

After cutting two single glass sheets to shape, once again a frame-shaped decorative colored coating of a baking finish is printed onto side II of the outer glass sheet by the screen printing process and the colored coating is dried. After the drying, a conductor network is printed onto side II in a second printing operation, once again using the screen printing process. The conductor network consists in known manner of narrow conductor strips leading to laterally situated collector bars. This printed-on conductor coating is also subjected to a drying operation.

The printed glass sheet is then laid, with the printed side II upwards, onto side IV of the other glass sheet. The two glass sheets are now first prebent, as described in Example 1, on a first frame-shaped bending mold, the bending surface of which corresponds exactly to the shape of the inwardly orientated glass sheet of the finished laminated pane. In this first bending process, the printed-on coatings are simultaneously baked in. After the prebent glass sheet pair has cooled, the two single glass sheets are transposed and are definitively bent into their final shape on a second frame-shaped bending mold. The bending surface of the second mold corresponds exactly to the shape of the outer glass sheet of the finished laminated glass pane.

The further processing of the laminated glass pane is carried out in known manner.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of making a curved glass pane of laminated glass, said laminated glass comprising a first glass sheet, an intermediate layer, and a second glass sheet, said first glass sheet having a first side and a parallel second side, and said second glass sheet having a third side and a parallel fourth side, wherein said second side of said first glass sheet and said third side of said second glass sheet bear against the intermediate layer, the method comprising the steps of:
   providing a baking finish on at least a portion of said second side of said first glass sheet;
   placing the first and second sheets together so that said second side of the first glass sheet faces upward and the first side of the first glass sheet and the fourth side of the second glass sheet are parallel;
   prebending the first and second sheets simultaneously into a non-final shape, while melting and baking-in the baking finish, thus providing prebent glass sheets;
   cooling the prebent glass sheets;
   transposing the first and second glass sheets; and
   jointly bending the glass sheets into a final shape.

2. The method according to claim 1, wherein the prebent glass sheets are provided by using a frame-shaped bending mold.

3. The method according to claim 2, wherein the frame-shaped bending mold has a bending surface which corresponds to the final shape on the third of the second glass sheet.

4. The method according to claim 1, wherein the transposed glass sheets are placed on a frame-shaped bending mold.

5. The method according to claim 4, wherein the bending surface of the frame-shaped bending mold corresponds to the final shape on the first side of the first glass sheet.

6. The method according to claim 1, wherein a decorative frame is disposed on surface of the second side of the first glass sheet.

7. The method according to claim 1, wherein said curved glass pane of laminated glass is an electrically heatable curved glass pane having baked-in current supply electrodes disposed on the surface of the second side of the first glass sheet and wherein a transparent conducting film is subsequently applied by a vacuum process.

8. The method according to claim 1, wherein said curved glass pane of laminated glass is an electrically heatable curved glass pane having printed-on and baked-in heating conductors disposed on the surface of the second side of the first glass sheet.

9. The method according to claim 1, wherein the step of prebending the first and second sheets together to provide the prebent glass sheets is carried out at a higher temperature than the step of jointly bending the glass sheets into a final shape.

10. The method according to claim 1, wherein after the final shape is achieved, the sheets are separated and then an electrically conducting multilayer system is applied onto the second side of the first glass sheet by magnetic field-assisted cathodic sputtering.

11. The method according to claim 1, wherein the glass pane is an automobile windshield or an automobile rear window, and the intermediate layer is a thermoplastic film.

12. The method according to claim 1, wherein the baking finish is color film.

13. A method of making a curved automobile glass pane of laminated glass, having an inner glass sheet and an outer glass sheet, and an intermediate layer, in which the outer glass sheet is provided, on at least a portion of the surface that is to bear against the intermediate layer in the curved automobile glass pane, with a coating of a baking finish, which is baked-in a preceding heat treatment operation before the glass sheets are vent into their final shape as a pair, comprising the steps of:
   applying a baking finish to the outer glass sheet to form a coated surface on the outer glass sheet;
   drying the baking finish;
   placing the outer glass sheet, with the coated surface upward, on the inner glass sheet;
   prebending the pair of glass sheets into a non-final shape with simultaneous melting and baking-in of the baking finish to form a prebent pair of glass sheets;
   cooling the prebent pair of glass sheets;
   providing the outer glass sheet with a heat-resistant parting agent;
   transposing the inner and outer glass sheets; and
   bending the prebent pair of glass sheets into a final shape corresponding to the curved automobile glass pane.

14. The method according to claim 13, wherein the pair of glass sheets is prebent on a frame-shaped bending mold.

15. The method according to claim 14, wherein the bending surface of the frame shaped bending mold corresponds to the final shape of the surface of the inner glass sheet bearing against the intermediate layer.

16. The method according to claim 13, wherein the prebent pair of glass sheets is bent into a final shape on a frame-shaped bending mold.

17. The method according to claim 16, wherein the bending surface of the frame-shaped bending mold corresponds to the final shape of the surface of the outer glass sheet.

18. The method according to claim 13, wherein the curved laminated glass panes are laminated glass panes having a decorative frame, said decorative frame disposed on the surface of the outer glass sheet bearing against the intermediate layer, the intermediate layer being a thermoplastic film.

19. The method according to claim 13, wherein the curved laminated glass panes are electrically heatable laminated glass panes having baked-in current supply electrodes, said baked-in current supply electrodes being disposed on the surface of the outer sheet bearing against the intermediate layer, the intermediate layer being a thermoplastic film, and wherein a transparent conducting film is subsequently applied by a vacuum process.

20. The method according to claim 13, wherein the curved laminated glass panes are electrically heatable laminated glass panes having printed-on and baked-in heating conductors disposed on the surface of the outer sheet bearing against the intermediate layer, the intermediate layer being a thermoplastic film.

* * * * *